3,449,103
PHOTOCHROMIC GLASS MAKING
Stanley D. Stookey, Corning, N.Y., assignor to Corning Glass Works, Corning, N.Y., a corporation of New York
No Drawing. Filed Dec. 20, 1965, Ser. No. 515,222
Int. Cl. C03c 3/30
U.S. Cl. 65—30                                    4 Claims

ABSTRACT OF THE DISCLOSURE

This invention relates to photochromic glass compositions wherein the glasses exhibit very low optical transmission upon exposure to actinic radiation, even when the glass shape is a very thin cross section since said glasses have a high concentration of radiation sensitive crystals which is related to a silver content greater than 0.7% and the halogen content which is greater than 0.6%.

---

Patent No. 3,208,860 constitutes the basic disclosure relative to photochromic glasses, or phototropic glasses as such have been frequently termed. That patent describes, in particular, inorganic silicate glasses containing submicroscopic crystals of the silver halides, viz., silver chloride, silver bromide, and silver iodide, which become darker in color when the glass is subjected to actinic radiation but which regain their original color when the actinic radiation is removed. As stated in that patent, this phenomenon is not fully understood but is believed to be the result of a reaction occurring between the actinic radiation and the crystals dispersed in the glassy matrix, the absorptive qualities of the crystals to visible radiations being altered thereby. Because these crystals are encased in a glassy matrix which is inert and impermeable to the reaction products developed upon such exposure, the removal of the actinic radiation allows the crystals to return to their ground state since the reaction products cannot diffuse away from the site of the reaction. The capability of these glasses to reversibly vary the transmission of visible light has suggested their utility in windows, ophthalmic lenses, building siding materials, and the like.

That patent discloses a range of preferred base glass compositions in the system $R_2O \cdot B_2O_3 \cdot Al_2O_3 \cdot SiO_2$, where $R_2O$ designates the alkali metal oxides. These glasses consist essentially, by weight on the oxide basis, of about 40–76% $SiO_2$, 4–26% $B_2O_3$, 4–26% $Al_2O_3$, and $R_2O$ being present in the indicated proportion selected from the group consisting of 2–8% $Li_2O$, 4–15% $Na_2O$, 6–20% $K_2O$, 8–25% $Rb_2O$, and 10–30% $Cs_2O$, the total of these recited base constitutents plus the silver and the halogens being at least 85% of the entire glass composition. The addition of very small amounts of such low temperature reducing agents as $SnO$, $FeO$, $Cu_2O$, $As_2O_3$, and $Sb_2O_3$ to enhance the photochromic behavior of the glass is also described, these amounts generally totalling less than 1% by weight. Finally, the incorporation of fluorine and $P_2O_5$ in the glass batches to aid melting or to inhibit devitrification as the glass melt is cooled and shaped as well as minor additions of such bivalent metal oxides as $MgO$, $CaO$, $SrO$, $BaO$, $ZnO$, and $PbO$ are also disclosed therein. These bivalent metal oxides do not act to improve the photochromic properties of the glass so their presence is limited to preclude the development of other crystal phases which would render the product completely opaque and unaffected by actinic radiation.

It can readily be appreciated that the optical density obtainable in photochromic glasses is directly related to the concentration of radiation-sensitive crystals therein. Nevertheless, as is pointed out in Patent No. 3,208,860, high concentration of silver and halides in the glass result in the formation of silver halide crystals of such large size as to scatter light from the visible portion of the spectrum passing therethrough and, in so doing, cause the glass to become translucent or opaque. The quantity limitations of silver and halides found applicable in that patent to assure the production of a transparent photochromic glass comprise a maximum of 0.7% and 0.6% by weight as analyzed, respectively of silver and the sum of the halides. Yet, it would be highly desirable in many applications, e.g., memory devices, to increase substantially the concentration of extremely fine-grained silver halide crystals, i.e., crystals in the size range of about 50–100 A., in order to achieve high optical densities even when the glass article is very thin in cross section. Thus, Patent No. 3,208,860 recognizes that photochromic behavior in glass can be observed where the concentration of radiation-sensitive crystals is as little as 0.005% by volume. However, in glasses having a cross section of only a few thousandths of an inch, the concentration of the crystals must be much greater than this to achieve the required high optical density, i.e., a high degree of darkening, useful in such things as memory devices.

Therefore, the principal object of this invention is to provide transparent photochromic glasses having high concentrations of very fine-grained silver halide crystals therein which result in high optical densities in these glasses even in thin cross sections thereof when exposed to actinic radiation.

Another object of this invention is to provide a method for making transparent photochromic glasses having high concentrations of very fine-grained silver halide crystals.

I have discovered that silicate base glasses can be chilled with sufficient rapidity from the melting temperature of the batch to form transparent glass shapes having a thickness not exceeding about 0.02″ for all concentrations of silver halide having liquid below the melting temperature of the batch. The preferred base glass compositions are substantially equivalent to those taught in Patent No. 3,208,860.

In its broadest aspects, my invention consists of melting a batch for a silicate glass containing silver and at least one of the halogens chlorine, bromine, and iodine, in such quantities that the amount present in the glass when analyzed will range in excess of 0.7% silver and 0.6% total halide and then chilling the melt almost instantaneously to a temperature below the transformation range (that temperature at which a liquid melt is deemed to have become an amorphous solid, this temperature being in the vicinity of the annealing point of a glass) to prevent excessive growth of silver halide crystals. This chilling is accomplished by forming very thin sheeting, generally less than 0.02″ in thickness, or by drawing fine fibers.

The preferred embodiment of my invention comprises melting a glass-forming batch of the desired composition and then chilling the melt by drawing it through metal rollers to form a sheet of not more than about 0.02″ in thickness and, preferably, less than 0.005″ in thickness. In so doing, the melt is quenched below its transformation point in but a few seconds, certainly less than five seconds. This sheeting is transparent and, depending upon the composition, may exhibit photochromic properties as drawn or can be made to display such properties by heat treating at relatively low temperatures (about 500°–800° C.) for times ranging from as little as one minute up to sixteen hours while still maintaining transparency. Longer heat treatments may be utilized but since the photochromic behavior of the glasses does not seem to be substantially affected thereby, these longer heat treatments are not deemed commercially practical.

By this method, the silver halide particles which would normally precipitate in relatively small numbers and grow large during cooling or during the reheating step are precipitated as many very small nuclei and the subsequent low temperature heat treatment favors the formation of more and smaller silver halide crystals. The final product, then, comprises a glass which contains a high concentration of photochromically darkenable crystals of dimensions too small to undesirably scatter light.

Table I records glass compositions, as analyzed on the oxide basis in weight percent, some of which exhibit photochromic behavior as made and others which exhibit such behavior after suitable heat treatment thereof. The batch ingredients may comprise any materials, either oxides or other compounds which, on being fused together, are converted to the desired oxide compositions in the proper proportions. In accordance with conventional analytic practice, the silver is expressed as being present as metallic silver although it is known that at least a substantial portion is present in the glass as ions thereof probably having bonds with oxygen and/or the halogens. Likewise, the halides are expressed as entities although they are actually present as ions in the glass.

chromic properties as rolled whereas Examples 7–16 were subjected to the above-recited heat treatment to promote a controlled growth of silver halide crystals and, thereby, improve the photochromic behavior of the glasses.

Table II demonstrates the photochromic behavior of Examples 1–16. This property can be illustrated by measuring the optical transmission of the glass sheet before and after exposure for a specified period of time to actinic radiation and again after a time interval following the termination of such exposure. In Table II $T_0$ represents the initial visible transmission, expressed in percent, of the glass, i.e., the transmission to visible light of the glass sheet before exposure to actinic radiation. $T\infty$ designates the equilibrium transmission of the glass. Equilibrium transmission is defined herein as the transmission to visible radiation of the glass after it has been subjected to actinic radiation of essentially constant intensity for a sufficient length of time to allow its percent transmission to reach a constant value. A 10-minute exposure to ultraviolet radiation (3650 A.) produced by a commercial "Mineralite" long-wave ultraviolet lamp having a 9-watt input, the output being filtered to remove the major pro-

TABLE I

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 56.86 | 56.68 | 56.39 | 56.33 | 56.21 | 55.95 | 54.04 | 51.10 | 56.27 | 56.80 | 56.47 | 56.04 | 56.51 | 58.61 | 59.52 | 61.92 |
| $Al_2O_3$ | 8.90 | 8.87 | 8.82 | 8.81 | 8.80 | 8.76 | 8.45 | 8.17 | 8.80 | 8.89 | 8.84 | 8.77 | 8.84 | 6.94 | 8.16 | 7.10 |
| $Na_2O$ | 10.06 | 10.02 | 9.97 | 9.96 | 9.94 | 9.90 | 9.56 | 9.24 | 6.41 | 6.47 | 6.43 | 6.18 | 6.44 | 6.46 | 6.99 | 6.61 |
| $B_2O_3$ | 18.76 | 18.70 | 18.60 | 18.59 | 18.55 | 18.47 | 17.83 | 17.34 | 20.86 | 21.06 | 20.97 | 20.78 | 20.95 | 17.35 | 19.42 | 18.14 |
| PbO | 0.97 | 0.96 | 0.96 | 0.96 | 1.91 | 1.90 | 1.84 | 1.78 | 2.87 | 2.90 | 2.89 | 2.86 | 2.88 | 4.82 | 2.62 | 2.96 |
| F | 1.40 | 1.39 | 1.39 | 1.39 | 1.39 | 1.38 | 1.33 | 1.29 | 1.39 | 0.48 | 0.48 | 0.48 | 0.48 | 0.48 | 0.49 | 0.49 |
| CuO | 0.016 | 0.016 | 0.015 | 0.015 | 0.015 | 0.015 | 0.015 | 0.014 | 0.015 | 0.015 | 0.015 | 0.015 | 0.015 | 0.015 | 0.019 | 0.047 |
| $K_2O$ | 1.16 | 1.16 | 1.15 | 1.15 | 1.15 | 1.14 | 1.10 | 1.07 | 1.15 | 0.39 | 0.38 | 0.38 | 0.38 | 0.39 | 0.39 | 0.39 |
| Br | 0.19 | 0.19 | 0.19 | 0.19 | 0.19 | 0.19 | 0.18 | 0.18 | 0.38 | 0.97 | 0.96 | 1.43 | 1.92 | 1.45 | 0.97 | 0.99 |
| Cl | 0.77 | 0.77 | 1.53 | 1.53 | 0.76 | 1.14 | 0.92 | 0.89 | 0.77 | 0.97 | 0.96 | 1.43 | 0.48 | 0.48 | 0.49 | 0.49 |
| Ag | 0.87 | 1.25 | 0.86 | 1.05 | 1.05 | 1.05 | 1.38 | 1.69 | 1.05 | 1.06 | 1.44 | 1.43 | 1.06 | 1.06 | 0.97 | 0.89 |
| MgO | | | | | | | | | | | | | | 1.93 | 1.94 | |

The halogens are particularly prone to volatilization and at the melting times and temperatures generally employed for these glasses, viz., about 1300°–1400° C., the loss due to this factor may be as high as 40–50% of the amount included in the batch. This loss is obviously dependent upon the melting times and temperatures utilized and the type of melting unit employed. The silver added is also subject to loss during melting of the batch through volatilization, probably as silver halide, but such loss is normally less than 25% of that added. It can be appreciated, however, that for any particular range of glasses desired, the person skilled in the glassmaking art can easily modify the composition of the batch to compensate for such loss and take special precautions to decrease volatilization, such as melting in enclosed units. Also, the wide latitude in the effective amounts of the essential ingredients permits the use of rough approximations for this purpose and the desired final product can still be obtained.

Thin sheets were formed from the glass compositions recorded in Table I by compounding conventional batch ingredients in proper proportions to yield the desired glass after making the necessary allowance for the volatilization of halide and metal and then ballmilling these components together to assure a homogeneous melt. Examples 1–6 were melted in covered crucibles for four hours at 1350° C. after which the temperature was raised to 1400° C. for 15 minutes and the melt poured through metal rollers to produce sheeting having a thickness of about 0.005″. Examples 7–12 were melted in covered crucibles for four hours at 1300° C. after which the temperature was raised to 1400° C. for 15 minutes and the melt poured through metal rollers to yield sheeting having a thickness of about 0.020″. Examples 13–16 were melted at 1350° C. for three hours after which the temperature was raised to 1400° C. for 15 minutes and the melt poured through metal rollers to form sheeting having a thickness of about 0.010″. The extremely rapid chilling resulting from the rolling of the melts into thin sheets precluded the precipitation and growth of crystals of such size and in such amounts to result in a translucent or opaque glass. Examples 1–6 exhibited good photoportion of the visible radiation, was arbitrarily considered to place the sample at equilibrium transmission. $H_{ft}$ represents the half-fading time, i.e., the time in seconds at which the concentration of color centers after the removal of the actinic radiation is one-half that at equilibrium. Since the rate of fading seems to be a logarithmic function, this expression furnishes a useful measure of the ability of the darkened glass to regain its original transmission. Each of the tests was conducted at room temperature on samples about 1¼″ square.

TABLE II

| Example No. | Heat treatment | $T_0$ | $T\infty$ | $H_{ft}$ |
|---|---|---|---|---|
| 1 | None | 92 | 54 | 100 |
| 2 | do | 91 | 49 | 150 |
| 3 | do | 92 | 52 | 120 |
| 4 | do | 92 | 50 | 180 |
| 5 | do | 92 | 50 | 150 |
| 6 | do | 92 | 51 | 180 |
| 7 | 700° C., 20 minutes | 91 | 43 | 240 |
| 8 | 600° C., 2 hours | 92 | 29 | 500 |
| 9 | do | 92 | 47 | 300 |
| 10 | 600° C., 16 hours | 92 | 29 | 540 |
| 11 | 800° C., 5 minutes | 89 | 31 | 400 |
| 12 | 700° C., 25 minutes | 90 | 34 | 360 |
| 13 | 700° C., 30 minutes | 91 | 52 | 300 |
| 14 | do | 89 | 21 | 600 |
| 15 | 600° C., 2 hours | 92 | 43 | 200 |
| 16 | 700° C., 30 minutes | 91 | 45 | 60 |

Table II clearly illustrates the photochromic properties which are exhibited by the glasses of this invention and the high optical densities attained therein even in very thin sheeting. Yet the glasses are transparent. In this, it can readily be seen that this invention makes possible the use of transparent glasses containing much higher concentrations of silver and halide than the 0.7% and 0.6%, respectively, taught by Patent No. 3,208,860, so that the optical densities upon exposure to actinic radiation will be very considerable even when the glass is in thin cross section. Although the method of this invention permits the inclusion of large amounts of silver and halides in the glass composition without yielding a translucent or opaque body, silver concentrations in excess of about 1.5% as analyzed do not seem to substantially improve the photochromic characteristics of the glass so, therefore, the inclusion of more than about 1.5% silver involves needless expense and waste. Likewise, the total amount of halogen is preferably limited to about 2% by weight as analyzed for practical reasons.

I claim:
1. A method for producing a transparent silver halide photochromic glass article exhibiting high optical density when present in thin cross section which comprises:
   (a) melting a batch for a glass consisting essentially, as analyzed in weight percent on the oxide basis, of 40–76% $SiO_2$, 4–26% $B_2O_3$, 4–26% $Al_2O_3$, at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$, a silver content greater than 0.7% and at least one halogen selected from the group consisting of chlorine, borine, and iodine, the total of said group being greater than 0.6%, the sum of the recited constituents consisting at least of 85% of the total glass composition, so that the melt is homogeneous and pourable; and
   (b)(i) contact chilling the pourable melt in less than five seconds to a temperature below the transformation temperature thereof, while
   (ii) simultaneously shaping an article from said melt having a thickness of less than about 0.02 inch,
   (iii) so as to produce a photochromic glass article having a high concentration of photochromically darkenable silver halide crystals of dimensions too small to undesirably scatter light.
2. A method according to claim 1 wherein the silver content is less than about 1.5%.
3. A method according to claim 1 wherein the total of the recited halogens is less than about 2%.
4. The method according to claim 2, wherein
   (a) the total of the recited halogens is less than about 2%,
   (b) the melt is chilled sufficiently rapidly by pouring said melt through metal rollers,
   (c) the silver halide crystals are present in the size range between about 50 and 100 A., and
      (i) the initial visible transmission is between 89 and 92, and
      (ii) the equilibrium transmission is between 21 and 54.

References Cited

UNITED STATES PATENTS

| | | | |
|---|---|---|---|
| 3,268,315 | 8/1966 | Stookey | 65—33 |
| 3,282,711 | 11/1966 | Lin | 65—33 |
| 3,325,299 | 6/1967 | Araujo | 65—33 XR |
| 3,328,182 | 6/1967 | Araujo et al. | 65—33 XR |

OTHER REFERENCES

Armistead et al.: Science, vol. 144, Apr. 10, 1964, pp. 150–154.

Stookey: Ceramic Industry, vol. 82, No. 4, April 1964, pp. 97–101.

DONALL H. SYLVESTER, *Primary Examiner.*

FRANK W. MIGA, *Assistant Examiner.*

U.S. Cl. X.R.

65—33; 96—94; 106—52